US011820208B1

(12) United States Patent
Nguyen et al.

(10) Patent No.: US 11,820,208 B1
(45) Date of Patent: Nov. 21, 2023

(54) DOOR WATER MANAGEMENT SYSTEM FOR VEHICLE DOOR

(71) Applicant: Honda Motor Co., Ltd., Tokyo (JP)

(72) Inventors: Khang C. Nguyen, Columbus, OH (US); Christos Agouridis, Birmingham, MI (US); Hiroshi Shingu, Walled Lake, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/826,643

(22) Filed: May 27, 2022

(51) Int. Cl.
*B60J 10/25* (2016.01)
*B60J 10/86* (2016.01)
*B60J 5/04* (2006.01)

(52) U.S. Cl.
CPC ............. *B60J 10/25* (2016.02); *B60J 5/0401* (2013.01); *B60J 10/86* (2016.02)

(58) Field of Classification Search
CPC . B60J 10/25; B60J 5/0401; B60J 5/045; B60J 10/86
See application file for complete search history.

(56) References Cited

U.S. PATENT DOCUMENTS

| | | | |
|---|---|---|---|
| 6,767,049 B1 * | 7/2004 | Morrison | B60R 13/0206 296/146.7 |
| 7,073,294 B2 * | 7/2006 | Yamaoka | B60J 10/80 49/475.1 |
| 8,020,920 B2 | 9/2011 | Toyozumi et al. | |
| 8,925,147 B2 | 1/2015 | Furuta et al. | |
| 9,302,569 B2 | 4/2016 | Ogino et al. | |
| 9,481,329 B2 | 11/2016 | Yoshimura et al. | |
| 9,580,027 B2 | 2/2017 | Lee et al. | |
| 9,751,389 B2 * | 9/2017 | Rompage | B60J 10/45 |
| 10,286,760 B2 * | 5/2019 | Dewasurendra | B60J 5/0418 |
| 11,065,944 B2 * | 7/2021 | Jeon | B60J 5/0413 |
| 2002/0004967 A1 * | 1/2002 | Saeki | B60R 16/0222 16/2.1 |
| 2011/0030279 A1 * | 2/2011 | Uto | E02F 9/00 49/381 |
| 2014/0361576 A1 * | 12/2014 | Storgato | B60J 5/045 296/146.6 |
| 2015/0244104 A1 | 8/2015 | Choo et al. | |
| 2016/0023542 A1 * | 1/2016 | Izuhara | B60J 5/0461 49/503 |

(Continued)

FOREIGN PATENT DOCUMENTS

| | | |
|---|---|---|
| CN | 108177508 A | 6/2018 |
| CN | 209141866 U | 7/2019 |
| EP | 2314471 A3 | 8/2015 |

(Continued)

*Primary Examiner* — Daniel J Troy
*Assistant Examiner* — Susan M. Heschel
(74) *Attorney, Agent, or Firm* — Plumsea Law Group, LLC

(57) ABSTRACT

A vehicle door including a door water management system is disclosed. The water management system includes a baffle installed within the door to direct water towards a lateral door of the door, preventing water from leaking inside a motor vehicle. The water management system also includes a grommet that is set within an opening of a stiffening member, which is disposed between an exterior skin member and an interior panel member of the vehicle door. The grommet protects a wire running through the opening of the stiffening member and helps prevent water from leaking through that opening.

20 Claims, 8 Drawing Sheets

(56) References Cited

U.S. PATENT DOCUMENTS

2019/0389403 A1* 12/2019 Yokoyama .......... B60R 16/0222

FOREIGN PATENT DOCUMENTS

| | | | |
|---|---|---|---|
| GB | 201321573 | A | 1/2014 |
| JP | 2007131019 | A | 5/2007 |
| JP | 2008302727 | A | 12/2008 |
| JP | 2009202727 | A | 9/2009 |
| JP | 4642564 | B2 | 3/2011 |
| JP | 2017114296 | A | 6/2017 |
| KR | 100568676 | B1 | 4/2006 |
| WO | 2017183906 | A1 | 10/2017 |

* cited by examiner

DOOR WATER MANAGEMENT SYSTEM FOR VEHICLE DOOR

BACKGROUND

The embodiments relate generally to motor vehicles, and in particular to systems for managing water passing through vehicle doors.

Doors in motor vehicles often include sealers to prevent water from migrating through windows or between the vehicle door and the vehicle body. Sealers may be applied in factory. However, in some situations, it may not be possible to apply a sealer to a door in a factory. If a vehicle door has a unique geometry and/or construction, there may be portions of the door where a sealer cannot be applied in factory or even by a supplier. Unsealed portions may be subject to unwanted water leaks, which may cause damage to the interior of the vehicle.

There is a need in the art for a system and method that addresses the shortcomings discussed above.

SUMMARY

The embodiments provide a vehicle door including a door water management system.

In one aspect, a vehicle door for a motor vehicle includes an exterior skin member joined to an interior panel member. The vehicle door also includes an upper door portion, a lateral door portion, and a window bounded on one side by the upper door portion and on another side by the lateral door portion. The exterior skin member and the interior panel member are separated by an internal gap at the upper door portion. The vehicle door also includes a baffle extending through the interior gap between the exterior skin member and the interior panel member at the upper door portion. The baffle acts to guide water away from the window and down the lateral door portion.

In another aspect, a vehicle door for a motor vehicle includes an exterior skin member joined to an interior panel member, the interior panel member further including a panel member opening. The vehicle door also includes a stiffening member disposed between the exterior skin member and the interior panel member, the stiffening member including a stiffening member opening. The vehicle door also includes a grommet that is set within the stiffening member opening.

In another aspect, a vehicle door for a motor vehicle includes an exterior skin member joined to an interior panel member, the interior panel member further including a panel member opening. The vehicle door also includes a stiffening member disposed between the exterior skin member and the interior panel member, the stiffening member including a stiffening member opening. The vehicle door also includes an upper door portion, a lateral door portion, and a window bounded on one side by the upper door portion and on another side by the lateral door portion. The exterior skin member and the interior panel member are separated by an internal gap at the upper door portion. The vehicle door also includes a baffle extending through the interior gap between the exterior skin member and the interior panel member at the upper door portion and a grommet set within the stiffening member opening.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

The embodiments provide a vehicle door including a door water management system. The water management system includes a baffle installed within the door to direct water towards a lateral side of the door. This helps prevent water from leaking inside a motor vehicle through, for example, unsealed portions of the door. The water management system also includes a grommet that is set within an opening of a stiffening member, which is disposed between an exterior skin member and an interior panel member of the vehicle door. The grommet protects one or more wires running through the opening of the stiffening member and helps prevent water from leaking through that opening.

Figure 1:
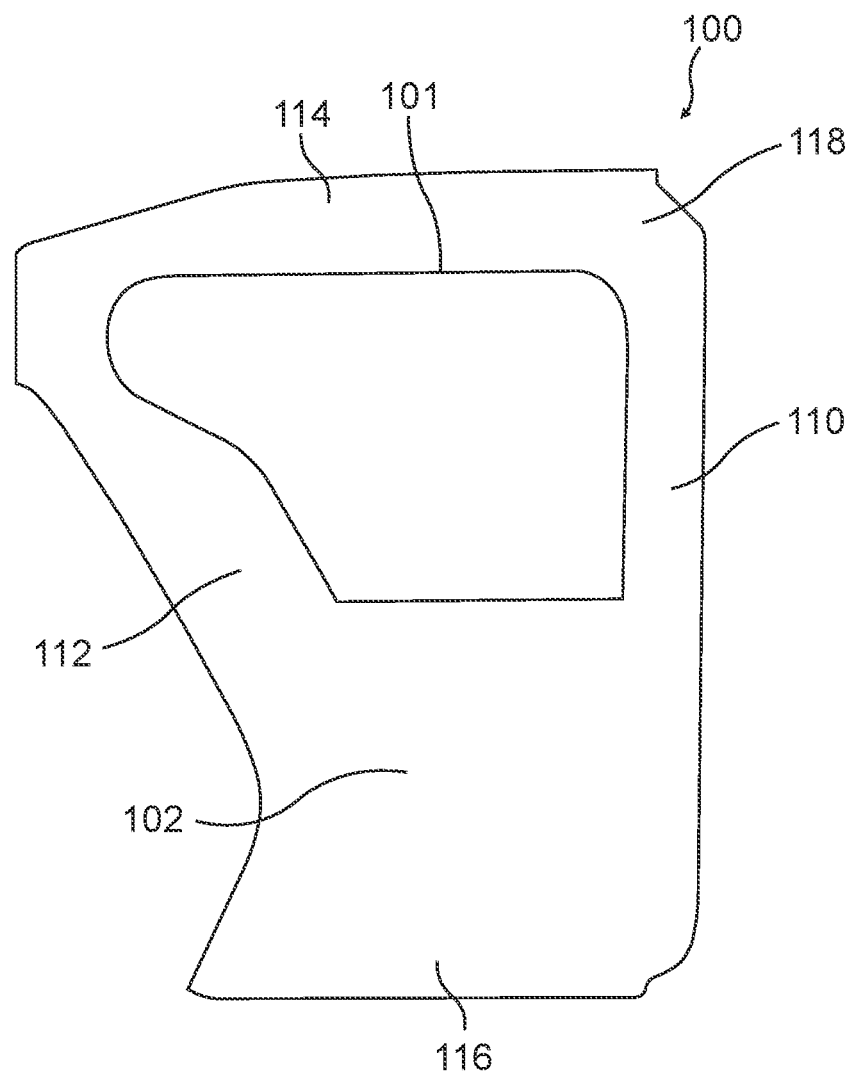
FIG. 1 is a schematic view of a vehicle door, according to an embodiment.

For purposes of introduction, an overview of one embodiment of the proposed system is illustrated with reference to FIGS. 1-2. Referring first to FIG. 1, a vehicle door 100 for a motor vehicle is shown in isolation. Vehicle door 100 may be configured as a sliding door that can be used with a van, sports utility vehicle, or other suitable vehicle. Although a particular kind of vehicle door is shown here, it may be appreciated that the features described herein could be used with a variety of different vehicle doors having different sizes, shapes, and material constructions. Moreover, one or more of the disclosed features could be used with doors that swing open rather than slide open.

Vehicle door 100 may be understood to comprise a first lateral door portion 110, a second lateral door portion 112, an upper door portion 114, and a lower portion 116. First lateral door portion 110 and upper door portion 114 may be seen to meet at a corner portion 118 of vehicle door 100.

Vehicle door 100 also includes a window opening 101 that may be configured to receive a windowpane. Window opening 101 is framed above by upper door portion 114 and to one lateral side by first lateral door portion 110.

Vehicle door 100 may include an exterior skin member 102 (FIG. 1), which is visible on the exterior of a motor vehicle. In some cases, exterior skin member 102 may comprise a metal or fiberglass material. In other cases, exterior skin member 102 could comprise any other suitable materials.

Figure 2:
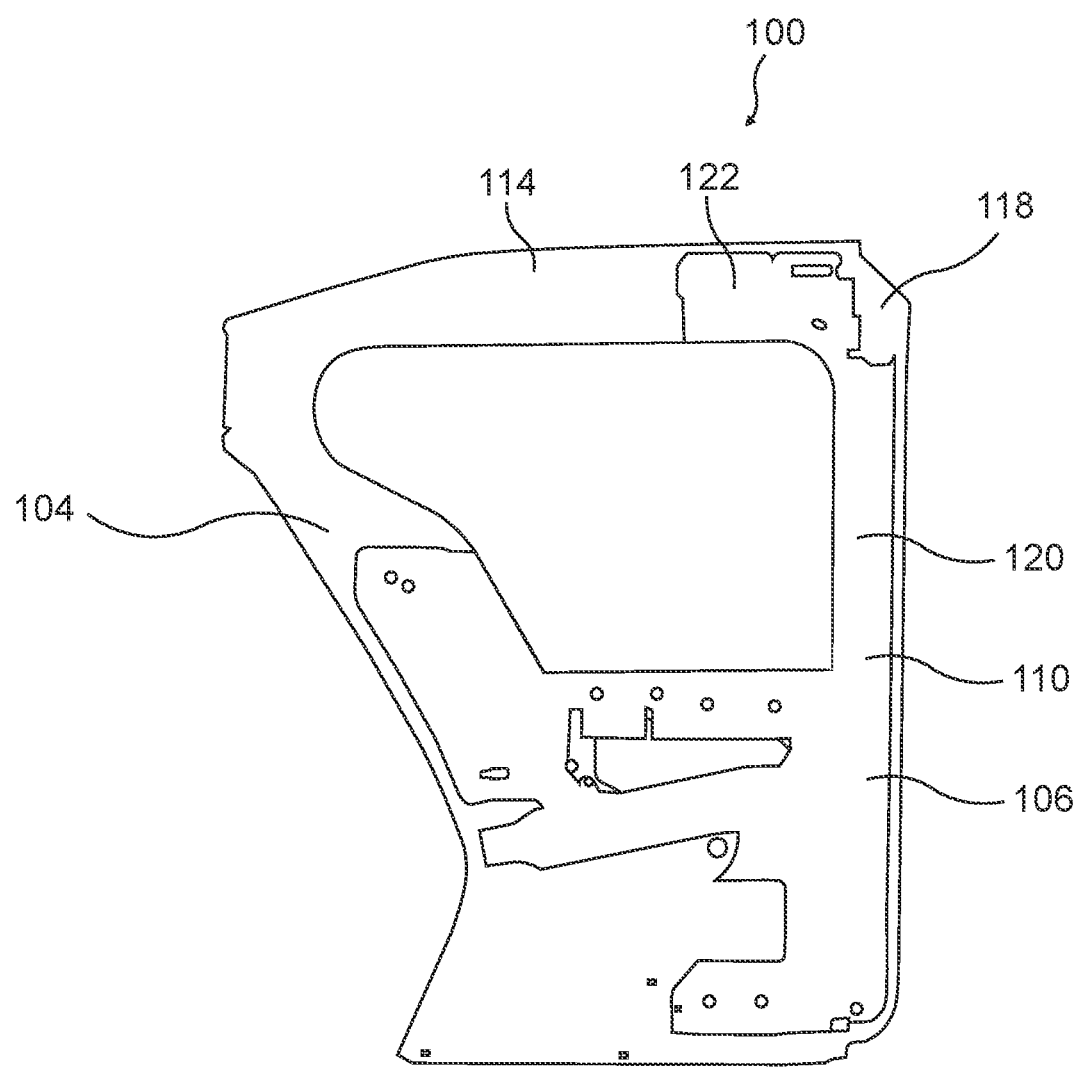
FIG. 2 is a schematic view of an interior panel member and a stiffening member of a vehicle door, according to an embodiment.

Vehicle door 100 can also include an interior panel member 104, which is shown in FIG. 2. In FIG. 2, exterior skin member 102 has been removed, so that portions of interior panel member 104 are visible. Interior panel member 104 could be made of any suitable materials including metal, fiberglass, plastic, or other materials. In some cases, interior panel member 104 could be directly visible from the interior of a motor vehicle. In other cases, additional molding and other layers could be disposed over, or cover, interior panel member 104.

Vehicle door 100 can also include a stiffening member 106 that is disposed between exterior skin member 102 and interior panel member 104. Stiffening member 106 may be comprised of a sufficiently stiff material that can provide additional strength and reinforcement to portions of vehicle door 100. Exemplary materials include metal, fiberglass, plastics, or other suitably stiff materials.

In the exemplary embodiment, stiffening member 106 includes a lateral side stiffening portion 120 that extends down first lateral door portion 110 of vehicle door 100. Stiffening member 106 also includes an upper stiffening portion 122 that extends through corner portion 118 of vehicle door 100.

Figure 3:
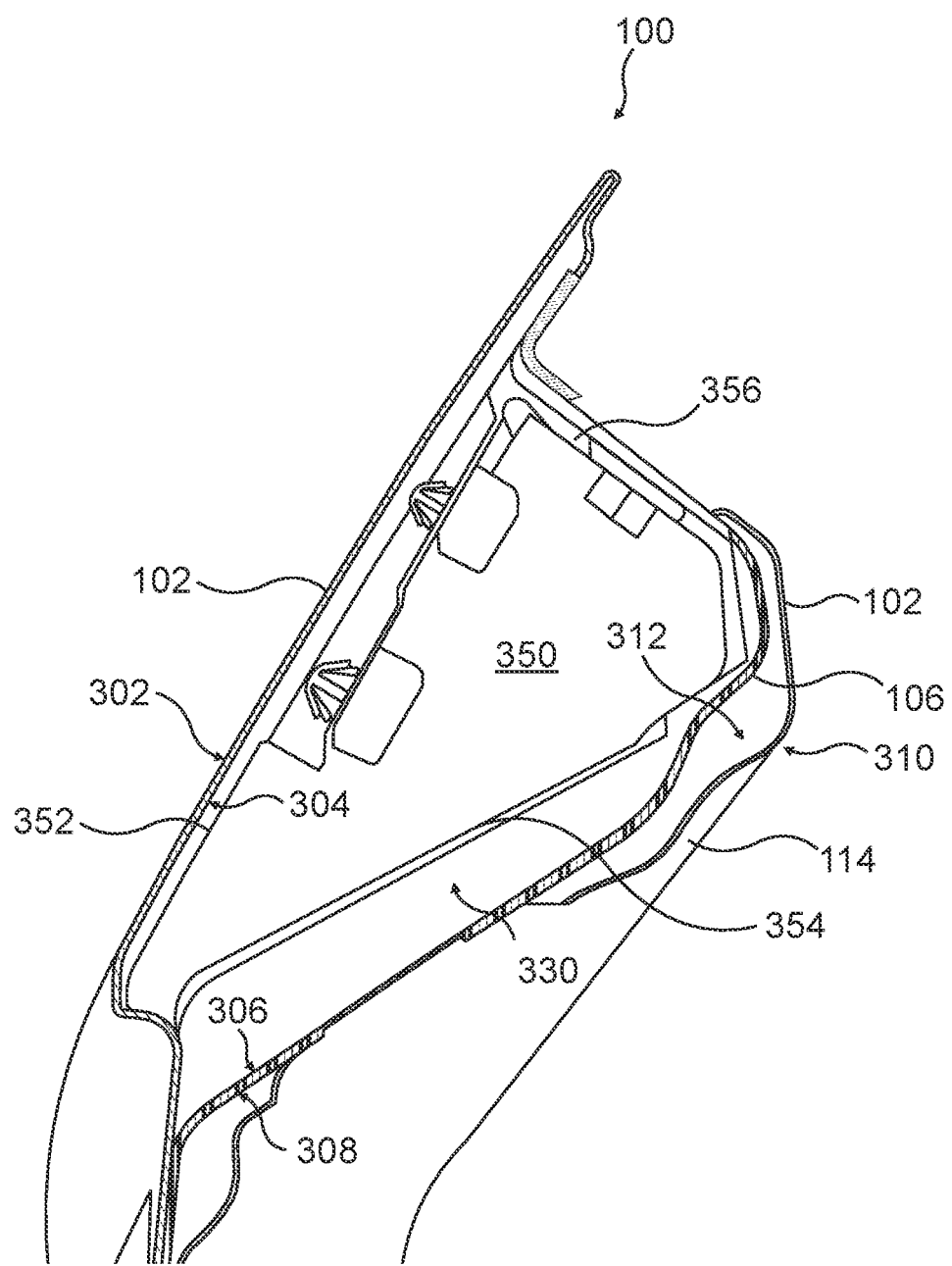
FIG. 3 is a schematic cut-away view showing a baffle inside a vehicle door, according to an embodiment.

FIG. 3 shows a schematic cut-away view taken at upper door portion 114 of vehicle door 100. Each of the exterior skin member 102, interior panel member 104, and stiffening member 106 can include an outwardly facing side and an inwardly facing side. As used herein, an "outwardly facing side" of a component faces away from an interior of a vehicle when a vehicle door is installed and closed. Likewise, an "inwardly facing side" of a component faces towards the interior of the vehicle. Thus, exterior skin member 102 includes an outwardly facing side 302 and an inwardly facing side 304. Stiffening member 106 includes an outwardly facing side 306 and an inwardly facing side 308. And interior panel member 104 includes an outwardly facing side 310 and an inwardly facing side 312.

As seen in FIG. 3, exterior skin member 102 has an approximately flat geometry at upper door portion 114. By contrast, both interior panel member 104 and stiffening member 106 have curved geometries at upper door portion 114, which bows away from exterior skin member 102. This geometry creates an interior gap 330 between the interior and exterior of vehicle door 100 at upper door portion 114.

The embodiments can include provisions to limit water leaking from the door in through the window, and/or between components of the door and components of the vehicle body. To these ends, the embodiments can include a door water management system. As described in further detail below, a door water management system may include a baffle for controlling the flow of water within and/or along the door, as well as a grommet that is placed to limit water leaks through the door. As used herein, the term "baffle" refers to any device or component used to restrain, or otherwise control, the flow of fluid, such as water.

Referring to FIG. 3, the embodiments include a baffle 350 that is disposed within interior gap 330. Baffle 350 is configured to direct water entering vehicle door 100 at corner portion 118 away from window opening 101 (FIG. 1) and towards first lateral door portion 110, where the water can be channeled down and out of the bottom of vehicle door 100.

Figure 4:
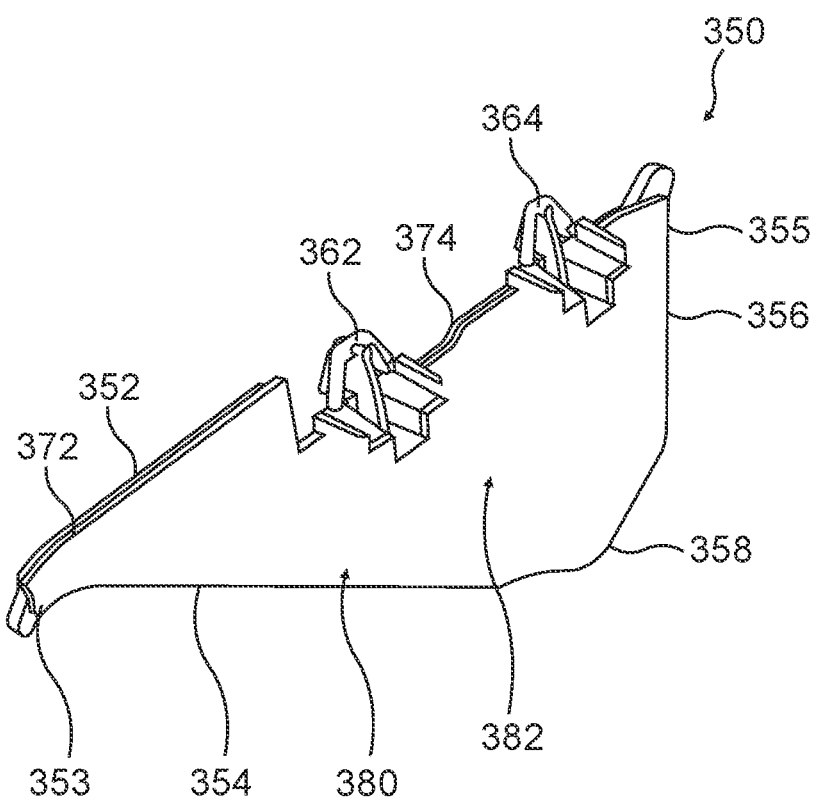
FIG. 4 is a schematic view of a baffle, according to an embodiment.

FIG. 4 shows a schematic view of baffle 350 in isolation. Referring to FIG. 4, baffle 350 may be characterized by a first edge portion 352, a second edge portion 354, and a third edge portion 356. First edge portion 352 and second edge portion 354 meet at a first baffle corner portion 353, while first edge portion 352 and third edge portion 356 meet at second baffle corner portion 355. By contrast, second edge portion 354 and third edge portion 356 are joined at a rounded baffle portion 358. Rounded baffle portion 358 has a relatively larger radius of curvature compared to first baffle corner 353 and second baffle corner 355.

Baffle 350 can include one or more fastening portions. In the embodiment of FIG. 4, baffle 350 includes a first fastening portion 362 and a second fastening portion 364. Each of these fastening portions are seen to have a barbed or flared geometry that could be inserted through fastener receiving holes on another component (such as an exterior skin member). To accommodate the extension of first fastening portion 362 and second fastening portion 364 from first edge portion 352, first edge portion 352 is seen to have a stepped geometry. Specifically, a first segment 372 of first edge portion 352 is raised relative to a second segment 374 of first edge portion 352. Moreover, first fastening portion 362 and second fastening portion 364 are disposed on second segment 374.

Together, first edge portion 352, second edge portion 354, and third edge portion 356 comprise a peripheral portion 380 of baffle 350 that surrounds a central portion 382. As shown in FIG. 4, central portion 382 has a solid geometry so that fluid cannot pass through central portion 382.

Referring back to FIG. 3, baffle 350 has a size and shape that fits interior gap 330, to help limit the flow of water across this portion of interior gap 330. In some cases, first edge portion 352 is disposed adjacent exterior skin member 102. In some cases, first edge portion 352 may be in contact with exterior skin member 102, at least along some segments of the edge.

In some cases, second edge portion 354 may be disposed adjacent stiffening member 106. In some cases, second edge portion 354 may be in contact with stiffening member 106. Likewise, in some cases, third edge portion 356 of baffle 350 may be disposed adjacent a portion of stiffening member 106. In some cases, third edge portion 356 may be in contact with stiffening member 106.

Figure 5:
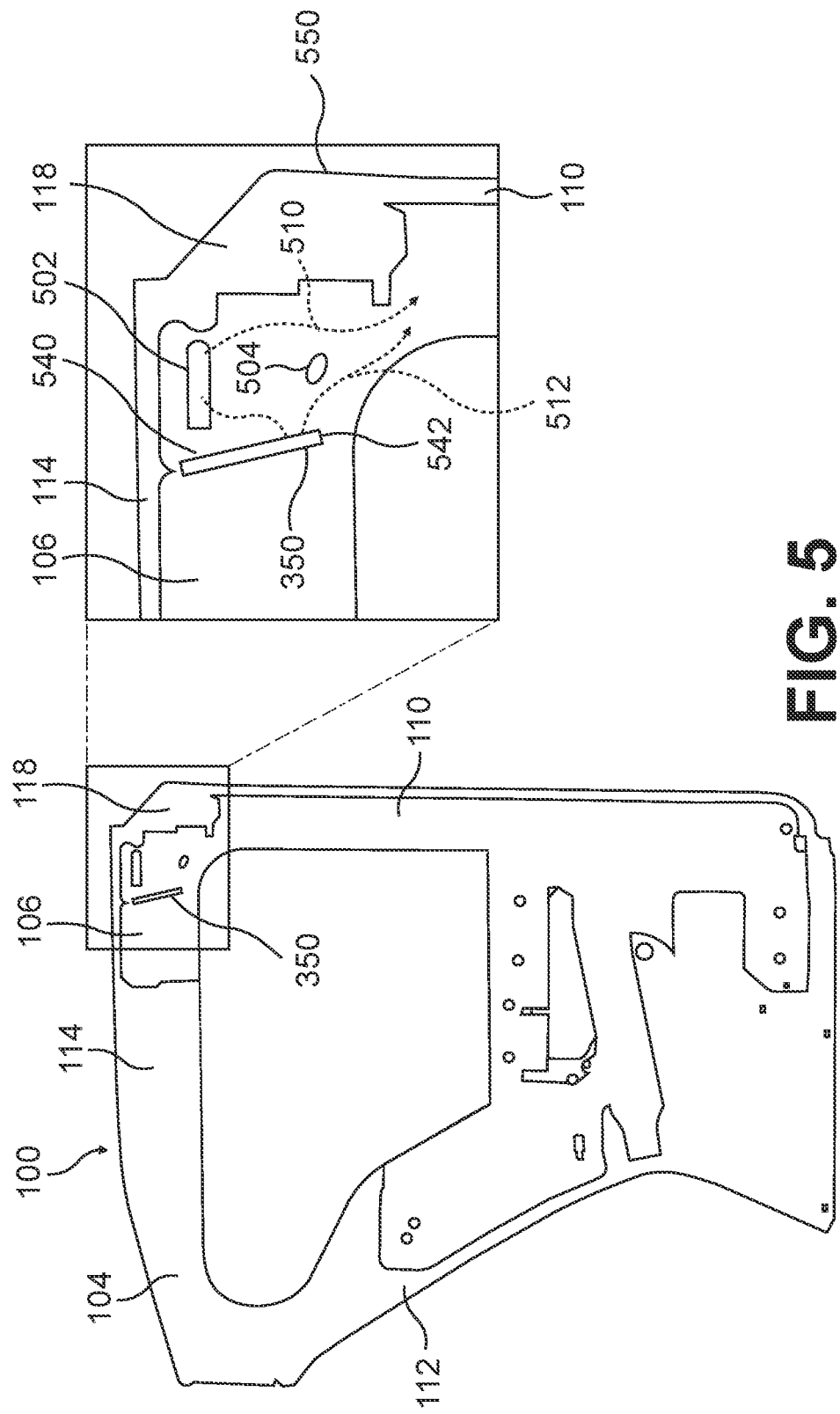
FIG. 5 is a schematic view of a vehicle door including an enlarged view of the location of a baffle, according to an embodiment.

FIG. 5 is a schematic view showing an enlarged view of corner portion 118 of vehicle door 100. For purposes of illustration, vehicle door 100 is shown with exterior skin member 102 removed, and the approximate location of baffle 350 is shown schematically. Also shown is a latch opening 502 in stiffening member 106, for receiving a latch. Additionally, a stiffening member opening 504 is shown, which is configured to receive a grommet for supporting wires, as discussed in further detail below.

Referring to FIG. 5, water may enter the interior of vehicle door 100 through latch opening 502. Some water may tend to flow directly towards first lateral door portion 110 of vehicle door 100 (first flow path 510). However, some water may tend to initially flow away from first lateral door portion 110 (second flow path 512). Water directed along second flow path 512 will contact baffle 350, which prevents the water from flow further back along upper door portion 114 where it could leak down through window opening 101 in locations where no sealer is present. Instead, baffle 350 acts to redirect the water back towards first lateral door portion 110.

In some cases, a baffle may be oriented at an oblique angle to the top edge of a vehicle door. This provides a slanted or titled orientation for the baffle that helps ensure water will run down the baffle and towards the nearest lateral side of the door. In the exemplary embodiment, baffle 350 may be oriented at oblique angle with respect to a lateral direction running between first lateral door portion 110 and second lateral door portion 112. Here, the lateral direction may be approximately parallel with upper door portion 114 of vehicle door 100. Moreover, the oblique angle formed between baffle 350 and the lateral direction is such that an uppermost portion 540 of baffle 350 is disposed further, with respect to the lateral direction, from a lateral edge 550 of vehicle door 100 than is lowermost portion 542 of baffle 350. Thus, not only is baffle 350 titled, but it is tilted in a direction that ensures water runs down towards first lateral door portion 110 so that it can be guided down away from window opening 101 and out the bottom of vehicle door 100.

As seen in FIG. 5, water entering through latch opening 502 could flow through stiffening member opening 504 where it could leak into the interior of the vehicle through the window opening. To limit any leaking at the stiffening member opening, which is needed so that wires can pass through both stiffening member 506 and interior panel member 504, the embodiments can use a grommet.

Figure 6:
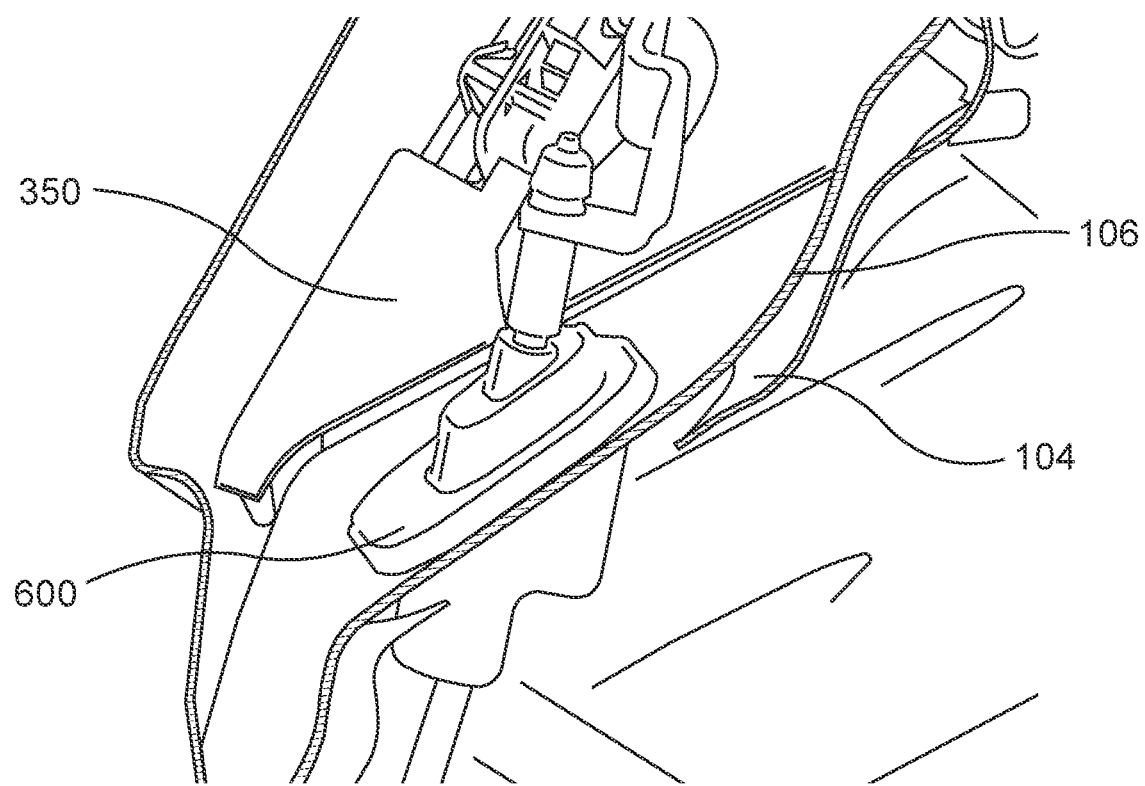
FIG. 6 is a schematic view of an interior of a portion of a vehicle door, according to an embodiment.
Figure 7:
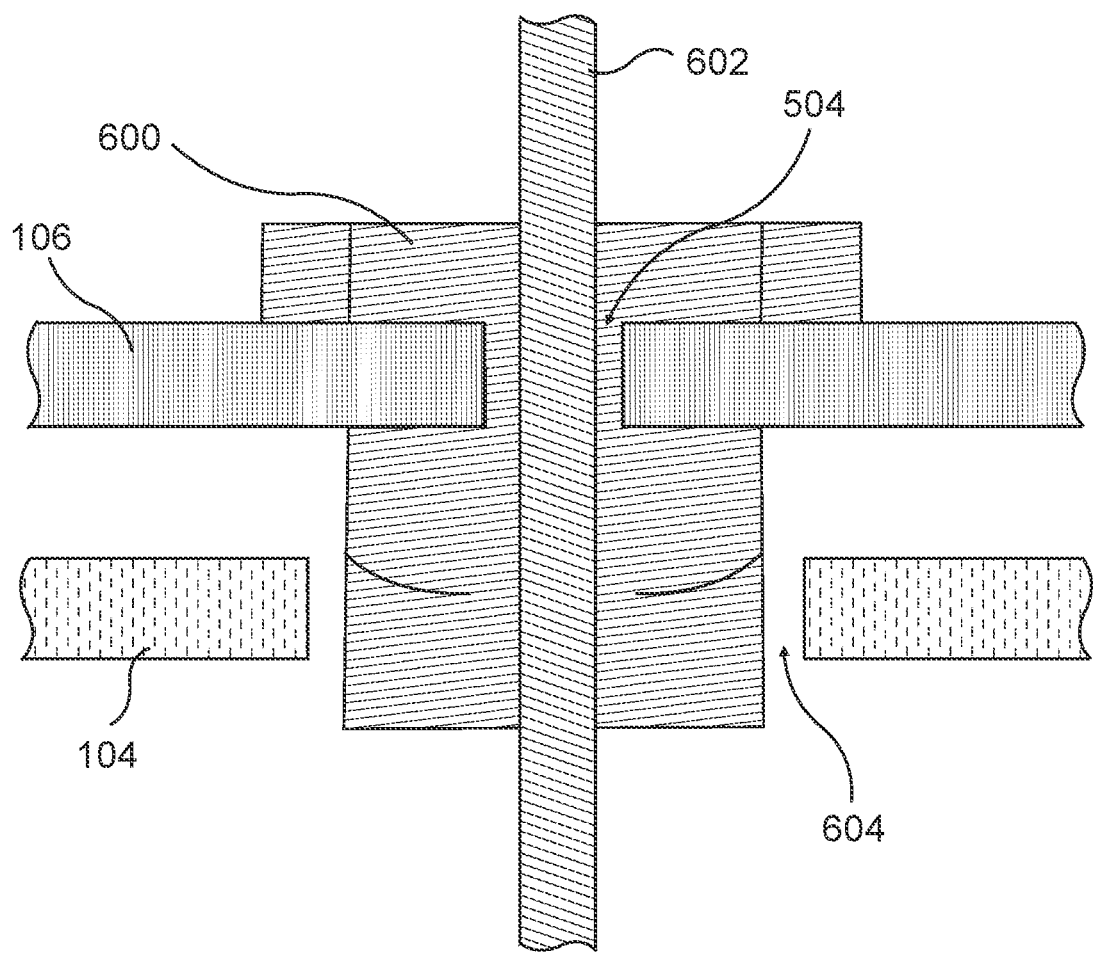
FIG. 7 is a schematic view of a grommet set within a stiffening member and exposed through an opening in an interior panel member, according to an embodiment.

FIG. 6 is a schematic cut-away view showing where a wire 602 and associated grommet 600 pass through components of vehicle door 100. This may also be seen in FIG. 7, which is an enlarged cross-sectional portion of vehicle door 100 at the location where grommet 600 is set within opening 504. As shown in FIGS. 6-7, grommet 600 is set within opening 504 of stiffening member 106 so that water cannot leak through stiffening member opening 504.

As seen in FIG. 7, stiffening member opening 504 is approximately aligned with a corresponding panel member opening 604 in interior panel member 104. Here, stiffening member opening 504 may be substantially smaller in diameter than panel member opening 604.

Figure 8:
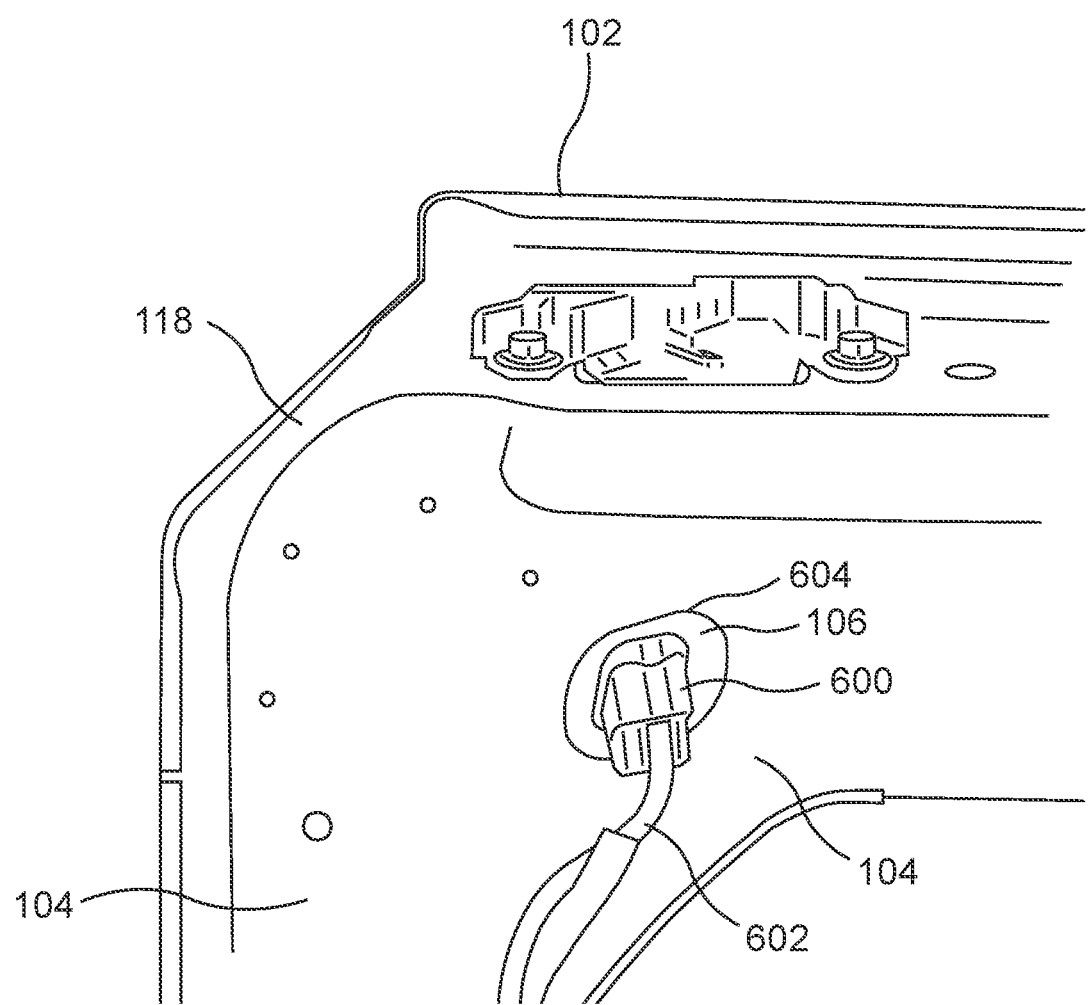
FIG. 8 is a schematic view of a portion of a vehicle door in which an interior panel is visible, according to an embodiment.

FIG. 8 is a schematic view of corner portion 118 as seen from the interior of the vehicle, such that panel member 104 is visible and exterior skin member 102 is disposed on an opposite side (and not visible except at the very edges of the door). As seen in FIG. 8, grommet 600 is set within stiffening member 106, rather than interior panel member 104. With this configuration, wire 602 can pass through both stiffening member 106 and a corresponding panel member opening 604 in interior panel member 104 while also preventing water from passing through the opening in stiffening member 106 (opening 504 as seen in FIGS. 5-7).

Taken together, then, these features (baffle 350 and the placement of grommet 600) provide a door water management system. This system directs water away from unsealed portions of door adjacent a window opening, and towards a lateral side of the door so the water can be channeled vertically downwards. Additionally, placing a grommet in an opening of a stiffening member prevents water directed towards the lateral side from leaking through the stiffening member and into spaces between the stiffening member and the interior panel member, or through the interior panel member into an interior of the vehicle.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A vehicle door for a motor vehicle, comprising:
an exterior skin member joined to an interior panel member;
an upper door portion, a lateral door portion, and a window bounded above by the upper door portion and on another side by the lateral door portion;
wherein the exterior skin member and the interior panel member are separated by an internal gap at the upper door portion;
a baffle extending through the interior gap between the exterior skin member and the interior panel member at the upper door portion;
a stiffening member disposed between the exterior skin member and the interior panel member, the stiffening member including a stiffening member opening at the upper door portion;
the baffle being oriented to direct water entering the interior gap through the stiffening member opening away from the window and towards the lateral door portion.

2. The vehicle door according to claim 1, wherein the baffle includes a first edge portion and a second edge portion, wherein the first edge portion is disposed proximate to the exterior skin member and wherein the second edge portion is disposed proximate the interior panel member.

3. The vehicle door according to claim 2, wherein the first edge portion of the baffle contacts an inward facing side of the exterior skin member.

4. The vehicle door according to claim 2, wherein the second edge portion of the baffle contacts the stiffening member.

5. The vehicle door according to claim 2, wherein the baffle includes at least one fastening portion, and wherein the fastening portion is attached to the vehicle door at a location adjacent the exterior skin member.

6. The vehicle door according to claim 1, wherein the baffle is disposed above the window.

7. The vehicle door according to claim 1, wherein the vehicle door has an upper corner portion at the intersection of the upper door portion and the lateral door portion, and wherein the baffle is located adjacent the upper corner portion.

8. The vehicle door according to claim 7, wherein the stiffening member opening is configured to receive a latch.

9. The vehicle door according to claim 7, wherein the stiffening member opening is disposed above a potion of the window.

10. A vehicle door for a motor vehicle, comprising:
an upper door portion, a lateral door portion, and a window bounded above by the upper door portion and on another side by the lateral door portion, wherein the upper door portion and the lateral door portion meet at a corner door portion of the vehicle door;

an exterior skin member joined to an interior panel member, the interior panel member further including a panel member opening at the corner door portion;

a stiffening member disposed between the exterior skin member and the interior panel member, the stiffening member including a stiffening member opening at the corner door portion;

a grommet; and wherein the grommet is set within the stiffening member opening to prevent water from leaking through the stiffening member opening; and wherein a portion of the grommet extends through the panel member opening.

11. The vehicle door according to claim 10, wherein the grommet is configured to protect a wire running through the stiffening member opening and the panel member opening.

12. The vehicle door according to claim 10, wherein the stiffening member opening is aligned with the panel member opening.

13. The vehicle door according to claim 10, wherein the stiffening member opening is smaller than the panel member opening.

14. A vehicle door for a motor vehicle, comprising:

an exterior skin member joined to an interior panel member, the interior panel member further including a panel member opening;

a stiffening member disposed between the exterior skin member and the interior panel member, the stiffening member including a first stiffening member opening and a second stiffening member opening disposed beneath the first stiffening member opening;

an upper door portion, a lateral door portion, and a window bounded on one side by the upper door portion and on another side by the lateral door portion;

where the exterior skin member and the interior panel member are separated by an internal gap at the upper door portion;

a baffle extending through the interior gap between the exterior skin member and the interior panel member at the upper door portion; and a grommet set within the second stiffening member opening to prevent water from leaking through the second stiffening member opening;

wherein the baffle is oriented within the interior gap to channel water entering through the first stiffening member opening away from the window and towards a portion of the door including the grommet and the second stiffening member opening.

15. The vehicle door according to claim 14, wherein the vehicle door has an upper corner portion at the intersection of the upper door portion and the lateral door portion, and wherein the baffle is located adjacent the upper corner portion.

16. The vehicle door according to claim 14, wherein the first stiffening member opening is configured to receive a latch.

17. The vehicle door according to claim 14, wherein the vehicle door further includes a wire, wherein a portion of the wire extends through the grommet at the second stiffening member opening.

18. The vehicle door according to claim 17, wherein the portion of the wire also extends though the panel member opening.

19. The vehicle door according to claim 14, wherein the baffle is disposed above the window.

20. The vehicle door according to claim 15, wherein the first stiffening member opening is disposed in the upper door portion.

* * * * *